United States Patent
Banerjee et al.

(10) Patent No.: US 7,478,400 B1
(45) Date of Patent: Jan. 13, 2009

(54) EFFICIENT DISTRIBUTED TRANSACTION PROTOCOL FOR A DISTRIBUTED FILE SHARING SYSTEM

(75) Inventors: Anindya Banerjee, West Bengal (IN); Sivaramakrishna Ramadugu Venkata, Hyderabad (IN); Navin Kabra, Pune (IN); Kai Wong, Saratoga, CA (US); Bijaya Laxmi Nanda, Orissa (IN)

(73) Assignee: Symantec Operating Corporation, Cupertino, CA (US)

( * ) Notice: Subject to any disclaimer, the term of this patent is extended or adjusted under 35 U.S.C. 154(b) by 804 days.

(21) Appl. No.: 10/749,300

(22) Filed: Dec. 31, 2003

(51) Int. Cl.
*G06F 3/00* (2006.01)
*G06F 15/16* (2006.01)

(52) U.S. Cl. ..................... 719/313; 709/201
(58) Field of Classification Search ................. 719/310, 719/313; 709/210
See application file for complete search history.

(56) References Cited

U.S. PATENT DOCUMENTS

| | | | |
|---|---|---|---|
| 5,680,610 A * | 10/1997 | Smith et al. .................... 707/10 |
| 5,689,706 A | 11/1997 | Rao et al. |
| 5,764,897 A | 6/1998 | Khalidi |
| 5,799,305 A | 8/1998 | Bortvedt et al. |
| 5,832,512 A | 11/1998 | Mastors et al. |
| 5,864,851 A | 1/1999 | Breitbart et al. |
| 5,999,931 A | 12/1999 | Breitbart et al. |
| 6,173,293 B1 | 1/2001 | Thekkath et al. |
| 6,189,017 B1 | 2/2001 | Ronstrom et al. |
| 6,216,126 B1 | 4/2001 | Ronstrom |
| 6,338,146 B1 * | 1/2002 | Johnson et al. ................. 714/4 |
| 6,381,617 B1 * | 4/2002 | Frolund et al. ............... 707/202 |
| 6,434,555 B1 * | 8/2002 | Frolund et al. .................. 707/4 |
| 6,490,595 B1 | 12/2002 | Candee et al. |
| 6,625,604 B2 | 9/2003 | Muntz et al. |
| 6,748,381 B1 | 6/2004 | Chao et al. |
| 6,782,389 B1 | 8/2004 | Chrin et al. |
| 6,839,769 B2 | 1/2005 | Needham et al. |
| 6,877,107 B2 * | 4/2005 | Giotta et al. .................... 714/4 |
| 7,206,805 B1 * | 4/2007 | McLaughlin, Jr. .......... 709/203 |
| 2002/0065919 A1 | 5/2002 | Taylor |
| 2002/0114341 A1 | 8/2002 | Sutherland |
| 2002/0147815 A1 | 10/2002 | Tormasov |

OTHER PUBLICATIONS

A. Rowstron and P. Druschel. "Pastry: Scalable, distributed object location and routing for large-scale peer-to-peer systems." In Proc. *IFIP/ACM Middleware 2001*, Heidelberg, Germany, Nov. 2001.

(Continued)

*Primary Examiner*—Meng-Ai An
*Assistant Examiner*—Lechi Truong
(74) *Attorney, Agent, or Firm*—Meyertons Hood Kivlin Kowert & Goetzel, P.C.; Jason L. Burgess (57) ABSTRACT

An efficient distributed transaction protocol for a distributed file sharing system is described. One embodiment of the protocol involves a transaction coordinator node sending three messages to participant nodes, where the participant nodes reply to only two of those messages. In one embodiment, the transaction coordinator node may return success to the client application after receiving replies to the second message from the participant nodes. The protocol may provide benefits associated with traditional three-phase commit (3PC) protocols while also decreasing response time latencies experienced by client applications and decreasing network traffic.

15 Claims, 3 Drawing Sheets

OTHER PUBLICATIONS

Zhao, et al "Tapestry: An Infrastructure for Fault-tolerant Wide-area Location and Routing" *UCB Tech. Report UCB/CSD-01-1141*. Apr. 2001.

Stoica, et al "Chord: A Scalable Peer-to-peer Lookup Service for Internet Applications," *ACMSIGCOMM 2001*, San Diego, CA, Aug. 2001, pp. 149-160.

Manku, et al, "Symphony: Distributed Hashing in a Small World" Published in USITS, 2003.

Kubiatowicz, et al "OceanStore: An Architecture for Global-scale Persistent Storage" *Proceedings of ACM ASPLOS*, Nov. 2000.

Adya, et al; "FARSITE: Federated, Available, and Reliable Storage for an Incompletely Trusted Environment"; *Proceedings of the 5th OSDI*, Dec. 2002.

Garces-Erice, et al; "Hierarchical Peer-to-Peer Systems," In the Special issue of the *Parallel Processing Letters* (PPL), Dec. 2003, vol. 13, No. 4.

"Lustre Whitepaper Version 1.0" Cluster File Systems, Inc., Nov. 11, 2002.

Keidar, et al., "Increasing the resilience of distributed and replicated database systems," J. Comput. System Sci. (JCSS), special issue with selected papers from PODS 1995.

Kempster, et al., "A More Committed Quorum-Based Three Phase Commit Protocol," 1998.

"Large Scale Peer-to-Peer Experiments with Virtual Private Community (VPC) Framework," Iwao, et al., CIA 2002, LNAI 2446, pp. 66-81, 2002.

"BestPeer: A Self-Configurable Peer-to-Peer System," Ng, et al, Department of Computer Science, National University of Singapore, pp. 1-21, 2002.

* cited by examiner

EFFICIENT DISTRIBUTED TRANSACTION PROTOCOL FOR A DISTRIBUTED FILE SHARING SYSTEM

BACKGROUND OF THE INVENTION

1. Field of the Invention

This invention relates to computer networks and file storage systems. More particularly, the invention relates to an efficient distributed transaction protocol for a distributed file sharing system.

2. Description of the Related Art

In distributed file systems, files may be replicated across multiple computing nodes. Among other purposes, file replication serves to increase the availability of files in the presence of node and network failures. However, replicating files also entails keeping the file replicas coherent with respect to each other, which can be a difficult task. Distributed transaction protocols can be utilized to ensure the atomicity of transactions involving multiple nodes. For example, it may be desirable to ensure that either multiple replicas of a given file on a plurality of nodes are updated in response to an update request or that none of the replicas are updated.

One well known type of distributed transaction protocol is known as a two phase commit (2PC) protocol. According to one variation of 2PC, one node is chosen as the coordinator for a transaction. The transaction coordinator sends a request to prepare to commit to all the participant nodes in the transaction. Each participant node returns either a Yes (ready to commit) response or a No (abort) response. The coordinator collects the responses and reaches a decision. If any participant node voted No, the coordinator may decide to abort the transaction. Otherwise the transaction may be committed. The coordinator may inform each participant node of the commit or abort decision.

Between the two phases, each participant node may block, keeping its replica of the file locked while waiting for final word from the coordinator. Thus, if the coordinator fails in the first phase, each participant node may remain blocked and unable to resolve the transaction, resulting in unavailability of the file's replica on that node.

Non-blocking three-phase commit (3PC) protocols that do not suffer from the problem described above have been used in some systems. A quorum-based 3PC protocol has been proposed that allows a distributed transaction to always make progress and reach completion in the face of multiple failures as long as a quorum of the participants are available. In the absence of failures, this 3PC protocol and other traditional 3PC protocols require three round trips of messages from the transaction coordinator to each participant for successful completion of a transaction. Also, success is typically returned to the user (or client application) after all three phases complete successfully.

Thus, 3PC protocols known in the prior art can have a negative impact on a system's efficiency due to the amount of messaging and waiting that they entail. It would be desirable to enable a distributed file sharing system to perform a more efficient non-blocking distributed transaction protocol.

SUMMARY

According to one embodiment, a first node may receive a request from a client application, where the request requires a transaction. In response to the request, the first node may send a first message to a plurality of participant nodes participating in the transaction. In one embodiment, the first message may request each of the participant nodes to reply by indicating whether they can commit the transaction.

In response to receiving a reply to the first message from at least a quorum of the participant nodes, the first node may send a second message to the plurality of participant nodes. In one embodiment, the second message may comprise a message requesting each of the participant nodes to enter a state indicating that the transaction is to be committed.

In response to receiving a reply to the second message from at least a quorum of the participant nodes, the first node may return success to the client application. The first node may also send a third message to the plurality of participant nodes, wherein the third message instructs the participant nodes to commit the transaction. In one embodiment, the first node may return success to the client application before sending the third message to the plurality of participant nodes.

In one embodiment, the first node may forget about the transaction after sending the third message to the plurality of participant nodes. In other words, from the point of view of the first node, the transaction may be complete after sending the third message. Thus, the first node may expect no further replies from the participant nodes.

BRIEF DESCRIPTION OF THE DRAWINGS

A better understanding of the invention can be obtained when the following detailed description is considered in conjunction with the following drawings, in which.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
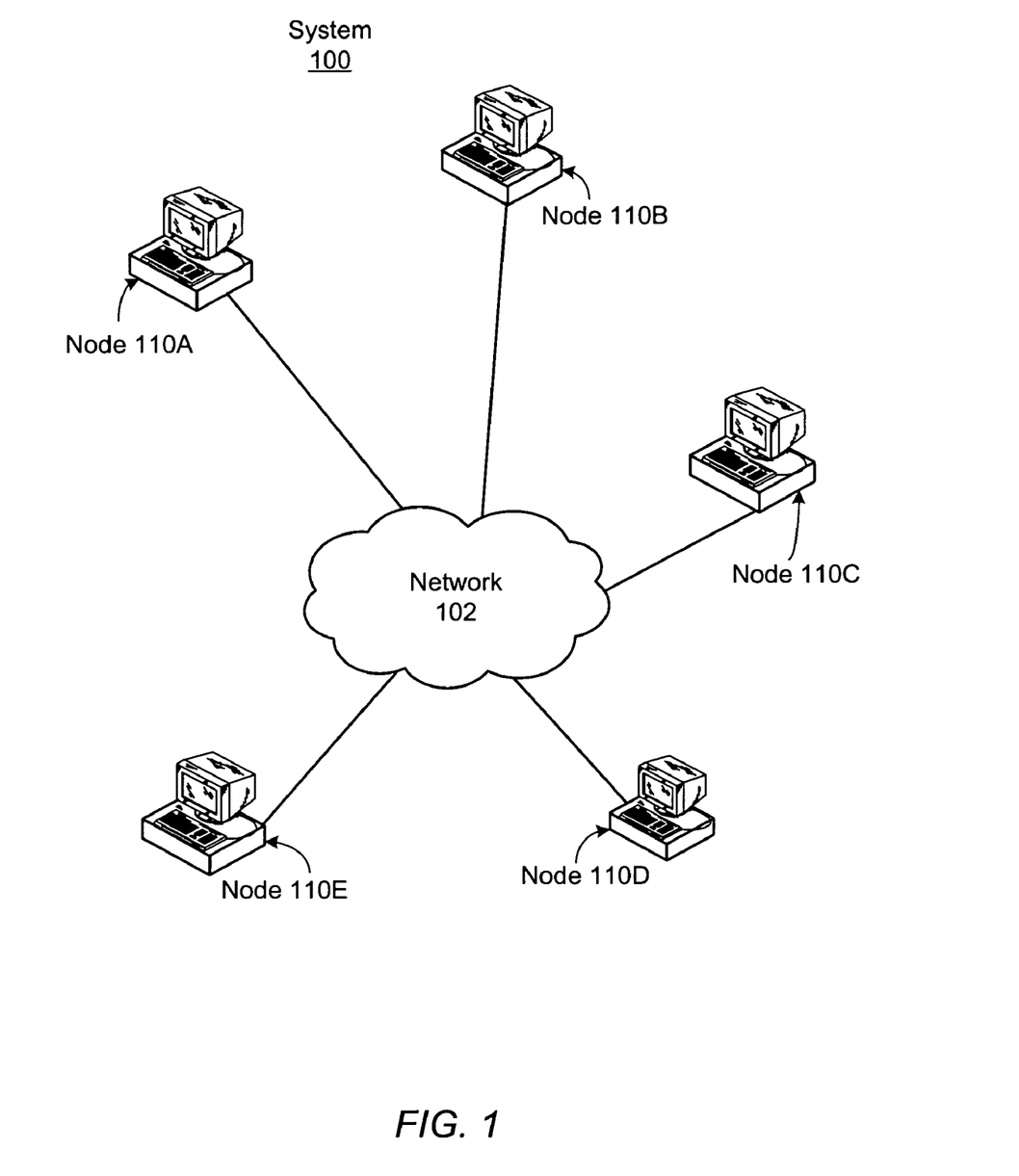
FIG. 1 illustrates one embodiment of a system including a plurality of nodes operable to perform distributed file sharing.

FIG. 1 illustrates one embodiment of a system 100 that includes a plurality of nodes (e.g., computer systems) 110. As described below, the plurality of nodes 110 may be operable to communicate to perform distributed file sharing (or sharing of other kinds of data objects). In this example, the system 100 includes nodes 110A-110E, although in various embodiments any number of nodes may be present. It is noted that throughout this disclosure, drawing features identified by the same reference number followed by a letter (e.g., nodes 110A-110E) may be collectively referred to by that reference number alone (e.g., nodes 110) where appropriate.

As shown, nodes 110A-110E may be coupled through a network 102. In various embodiments, the network 102 may include any type of network or combination of networks. For example, the network 102 may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each node 110 may be coupled to the network 102 using any type of wired or wireless connection medium. For example, wired mediums may include a modem connected to plain old telephone service (POTS), Ethernet, fiber channel, etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

In one embodiment, the nodes 110 may form a peer-to-peer network. For example, the system 100 may comprise a decentralized network of nodes 110 where each node 110 may have similar capabilities and/or responsibilities. Each node 110 may communicate directly with at least a subset of the other nodes 110. In one embodiment, messages may be propagated through the system 100 in a decentralized manner. For example, in one embodiment each node 110 in the system 100 may effectively act as a message router.

In another embodiment, the nodes 110 in the system 100 may be organized or may communicate using a centralized networking methodology, or the system 100 may utilize a combination of centralized and decentralized networking methodologies. For example, some functions of the system 100 may be performed by using various nodes 110 as centralized servers, whereas other functions of the system 100 may be performed in a peer-to-peer manner.

In one embodiment, each node 110 may have an identifier (ID). The ID of a node 110 may comprise any kind of information usable to identify the node 110, such as numeric or textual information. In one embodiment, a node ID may comprise a 128-bit (or other length) Universally Unique ID (UUID). Universally Unique IDs or UUIDs may be allocated based on known art that ensures that the UUIDs are unique.

Figure 2:
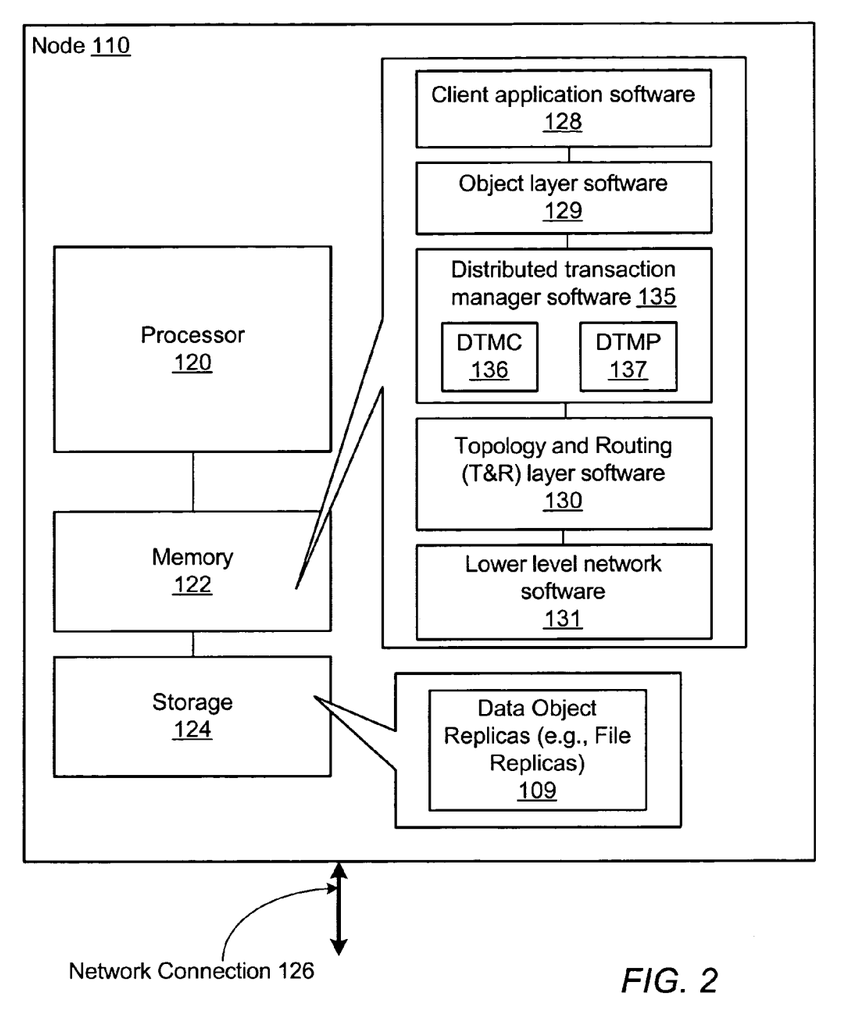
FIG. 2 illustrates one embodiment of a node in the system.

Referring now to FIG. 2, a diagram of one embodiment of a node 110 in the system 100 is illustrated. Generally speaking, a node 110 may include any of various hardware and software components. In the illustrated embodiment, the node 110 includes a processor 120 coupled to a memory 122, which is in turn coupled to a storage device 124. The node 110 may also include a network connection 126 through which the node 110 couples to the network 102. The network connection 126 may include any type of hardware for coupling the node 110 to the network 102, e.g., depending on the type of node 110 and type of network 102.

The processor 120 may be configured to execute instructions and to operate on data stored within the memory 122. In one embodiment, the processor 120 may operate in conjunction with the memory 122 in a paged mode, such that frequently used pages of memory may be paged in and out of the memory 122 from the storage 124 according to conventional techniques. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the node 110 may include multiple processors 120.

The memory 122 may be configured to store instructions and/or data. In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The storage 124 may be configured to store instructions and/or data, e.g., may be configured to store instructions and/or data in a stable or non-volatile manner. In one embodiment, the storage 124 may include non-volatile memory, such as magnetic media, e.g., one or more hard drives, or optical storage. In one embodiment, the storage 124 may include a mass storage device or system. For example, in one embodiment, the storage 124 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, the storage 124 may include tape drives, optical storage devices or RAM disks, for example.

As shown in FIG. 2, in one embodiment the storage 124 may store one or more data object replicas 109. In various embodiments, replicas of any kind of data object may be utilized in the system 100. For example, in one embodiment a data object may comprise a file. Thus, the data object replicas 109 may comprise replicas of files. In general, a data object may comprise data or information of any kind, where the data is organized or structured in any way. In various embodiments, the data object replicas 109 may be utilized within the system 100 in any application or to perform any function. Any number of replicas 109 may be stored in the storage 124 of a given node 110.

Various data objects may be replicated on different nodes 110. In other words, for a given data object, multiple nodes may store replicas 109 of the data object. As used herein, the term replica refers to an entity, e.g., a data structure or software construction, that represents a data object. Each replica 109 of a data object may include at least a portion of the data for the data object. In one embodiment, a replica 109 may also be an empty replica that does not include any of the data object's data. Replicating data objects across multiple nodes 110 in the system 100 may enable the nodes 110 to share data objects in a distributed manner. For example, where the data objects comprise files, the nodes 110 may collectively perform distributed file sharing.

In one embodiment, the system 100 may be operable to keep replicas 109 for a data object loosely coherent with respect to each other. Thus, at a given point in time, one or more replicas for a data object may not be completely synchronized with each other, e.g., due to an update performed on a first replica (or a first plurality of replicas) not yet being propagated to a second replica (or a second plurality of replicas). However, the system 100 may attempt to re-synchronize the replicas as quickly as possible.

As illustrated in FIG. 2, in one embodiment the node 110 may execute client application software 128. In various embodiments, the client application software 128 executing on nodes 110 in the system 100 may be associated with any of various kinds of distributed applications. The distributed application(s) may utilize distributed object sharing or distributed file sharing such as described above. Functions associated with the distributed object sharing or distributed file sharing may be performed by the object layer software 129. For example, the object layer software 129 may be operable to create and manage replicas 109.

Some functions performed by the object layer software 129 may require distributed transactions to be performed. As one example, the system may be operable to atomically update a plurality of replicas 109 using a distributed transaction. Nodes 110 may execute distributed transaction manager software 135 to manage distributed transactions required by the object layer software 129.

As illustrated in FIG. 2, in one embodiment the distributed transaction manager software 135 may include a distributed transaction manager coordinator (DTMC) component 136 and a distributed transaction manager participant (DTMP)

component 137. Each node 110 may at times act as a coordinator for a distributed transaction. In this case, the DTMC 136 on the node 110 may perform the operations required to coordinate the distributed transaction. Operations performed by the DTMC 136 according to one embodiment are described in detail below. At other times, a node 110 may act as a participant in a distributed transaction. In this case, the DTMP 137 on the node 110 may perform the operations required to participate in the distributed transaction. Operations performed by the DTMP 137 according to one embodiment are described in detail below.

In one embodiment, T&R layer software 130 may be executable by the processor 120 to create and manage data structures allowing client application software 128, object layer software 129, and/or distributed transaction manager software 135 to communicate with other nodes 110 in the system 100, e.g., to communicate with other client application software 128, object layer software 129, or distributed transaction manager software 135 executing on other nodes 110. In one embodiment, the T&R layer software 130 may be utilized to send messages to other nodes 110 via links established by the lower level network software 131. Similarly, the T&R layer software 130 may pass messages received from other nodes 110 to the client application software 128, object layer software 129, or distributed transaction manager software 135, e.g., may pass messages that originate from client application software 128, object layer software 129, or distributed transaction manager software 135 executing on other nodes 110. The T&R layer software 130 may also be involved in forwarding messages routed through the local node 110, where the messages originate from another node 110 and are addressed to another node 110 in the system 100.

The lower level network software 131 may be executable by the processor 120 to interact with or control the network connection 126, e.g., to send and receive data via the network connection 126. The lower level network software 131 may also be responsible for discovering other nodes 110 or establishing communication links from the node 110 to other nodes 110.

Efficient Distributed Transaction Protocol

As described above, distributed transaction manager software 135 may execute on nodes 110 to perform distributed transactions. The distributed transaction manager software 135 may implement a distributed transaction protocol that ensures the atomicity of transactions involving multiple nodes. For example, the distributed transaction protocol may be utilized to ensure that either multiple replicas 109 of a given file or data object on a plurality of nodes 110 are updated in response to an update request or that none of the replicas 109 are updated.

Figure 3:
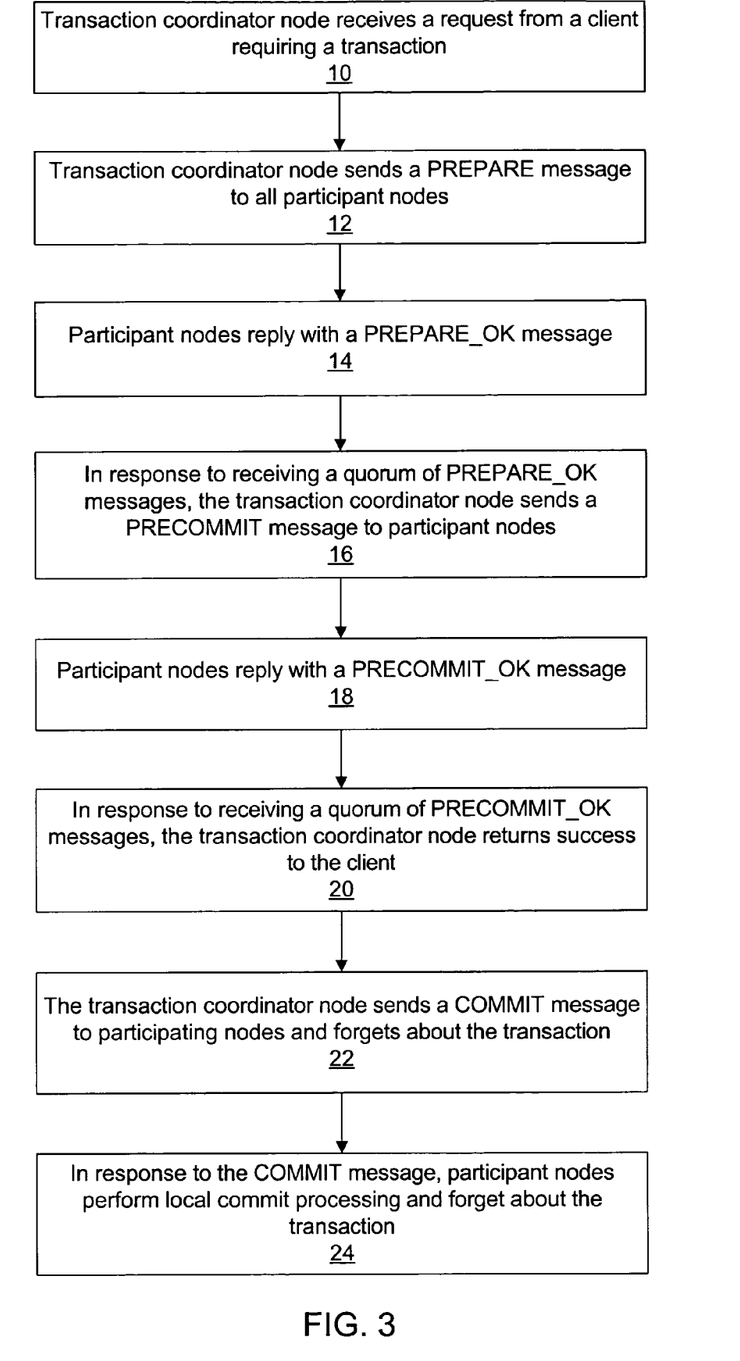
FIG. 3 is a flowchart diagram illustrating one embodiment of a method for performing an efficient distributed transaction protocol.

FIG. 3 is a flowchart diagram illustrating one embodiment of a method for performing an efficient distributed transaction protocol. As shown in 10, a transaction coordinator node may receive a request from a client, e.g., a client application. The request may require a transaction to be performed. For example, the request may require multiple similar actions to be performed with atomicity on a plurality of nodes. As one example, multiple replicas of a data object may be atomically updated on multiple nodes, as described above. In one embodiment, actions performed by the transaction coordinator node may be implemented by the distributed transaction manager coordinator (DTMC) software 136 executing on the node. Functions performed by the DTMC 136 according to one embodiment are described in additional detail below.

As shown in 12, the transaction coordinator node (e.g., the DTMC 136 on the transaction coordinator node) may send a PREPARE message to all participant nodes 110, i.e., to all nodes participating in the transaction. The set of participant nodes may be determined by the particular transaction. In the example of an update operation for a data object, the participant nodes may be the nodes on which the plurality of replicas 109 for the data object are stored. In one embodiment, the PREPARE message may be received by the distributed transaction manager participant (DTMP) software 137 executing on each of the participant nodes.

The PREPARE message may correspond to the message sent for the first phase of a three-phase commit protocol. For example, the PREPARE message may be sent to determine whether each participant node can commit the transaction, i.e., can perform the local actions required on that node to successfully complete the transaction. For the replica update example, this may comprise each participant node determining whether the node can successfully update the replica 109 stored on the node. For example, each node may determine whether there is sufficient storage space to add new data required for the update operation.

As shown in 14, each participant node (e.g., the DTMP 137 on each participant node) may reply with a PREPARE_OK message indicating that the node can commit the transaction. (The flowchart of FIG. 3 illustrates normal operation in which each node successfully performs required functions to commit the transaction and does not encounter errors. Various error scenarios and recovery operations are discussed in detail below.)

In response to receiving PREPARE_OK messages from at least a quorum of the participant nodes, the transaction coordinator node may send a PRECOMMIT message to the participant nodes, as shown in 16. The PRECOMMIT message may correspond to the message sent for the second phase of a three-phase commit protocol. For example, the PRECOMMIT message may be sent to request each of the participant nodes to enter a state indicating that the transaction is to be committed.

In one embodiment, a quorum may comprise a simple majority of the participant nodes. In other embodiments, different criteria may be used to decide what qualifies as a quorum. For example, various generalized criteria for deciding whether a subset of participant nodes qualifies as a quorum are described in the paper titled, "Increasing the Resilience of Distributed and Replicated Database Systems" by Keidar and Dolev (1998).

In response to receiving the PRECOMMIT message, each participant node may enter a state indicating that the transaction is to be committed and may reply with a PRECOMMIT_OK message, as shown in 18.

In response to receiving PRECOMMIT_OK messages from at least a quorum of the participant nodes, the transaction coordinator node may return success to the client, as shown in 20. In one embodiment, the transaction coordinator node may return success to the client before continuing with the distributed transaction protocol. Three phase commit (3PC) protocols used in prior art systems, on the other hand, typically do not return success to the client until all three phases have completed. Thus, the client may advantageously experience a shortened latency or response time for its request when the distributed transaction protocol of FIG. 3 is utilized.

The transaction coordinator node may then send a COMMIT message to participating nodes, as shown in 22. The transaction coordinator node may also forget about the transaction. In other words, from the point of view of the transaction coordinator node, the transaction is complete after sending the COMMIT message. Thus, the transaction coordinator node may expect no further replies from the participant nodes.

In response to the COMMIT message, each participant node may perform local processing required to commit the transaction, as shown in 24. The local processing may depend on the type of transaction being performed, i.e., the type of request received from the client application in 10. For example, in the case of an update request, each participant node may update its local replica with new data specified by the request. In one embodiment, the participant nodes may not need to reply to the COMMIT message. As noted above, the transaction coordinator may not expect further replies after sending the COMMIT message.

In one embodiment, each participant node may forget about the transaction in response to receiving the COMMIT message. In other words, from the point of view of each participant node, the transaction is complete after the COMMIT message has been received. In another embodiment, the DTMP instance on each participant nodes may forget about the transaction, but other software may temporarily continue to store information regarding the transaction for a time period. (For example, as described below, in one embodiment an object-specific plugin module may temporarily store information regarding the transaction after the transaction has been committed, and this information may be used in recovery operations if necessary.)

Thus, the distributed transaction protocol illustrated in FIG. 3 may be viewed as a "2.5 phase" commit protocol. In other words, one embodiment of the protocol involves the transaction coordinator node sending three messages, where the participant nodes reply to only two of those messages. This is in contrast to three phase commit (3PC) protocols used in prior art systems, which involve three complete round trips of messages between the transaction coordinator node and participant nodes. In a system in which distributed transactions are frequently performed, the reduced network traffic of the protocol described herein may provide a significant advantage. However, the protocol described herein may still provide other beneficial properties of prior art 3PC protocols. In particular, the protocol may allow a distributed transaction to always make progress and reach completion in the face of multiple failures as long as a quorum of the participants are available.

One embodiment of a distributed transaction protocol in accordance with the flowchart of FIG. 3 is described in more detail below. It is noted that the detailed distributed transaction protocol described below is exemplary, and in other embodiments alternative implementations may be used.

Detailed Description of a Distributed Transaction Protocol According to One Embodiment As described above, in one embodiment, a distributed transaction may be coordinated by the transaction coordinator node executing distributed transaction manager coordinator (DTMC) software 136. Similarly, in one embodiment distributed transaction manager participant (DTMP) software 137 may execute to handle the transaction on nodes participating in the transaction (also referred to below as storage participants or SPs).

In one embodiment, a modular interface may enable different types of transactions to be performed for different applications. The DTMP 137 may support a plug-in application programming interface (API) that specifies interactions between the DTMP (also referred to as the "generic DTMP") and an object-specific resource manager. Thus, different object-specific resource managers may be utilized in performing distributed transactions for different kinds of data objects or different applications. In one embodiment, transaction isolation and concurrency control may be provided by the object-specific resource manager. The generic DTMP may not interpret client data or block accesses to the participating storage resources.

In one embodiment, a transaction may involve multiple data objects. For example, multiple replicas of multiple data objects may be updated in a single transaction. In one embodiment, a storage coordinator (SC) representing each data object may be instantiated. In one embodiment, the SCs may be instantiated on the same node as the distributed transaction manager coordinator (DTMC). In another embodiment, the SCs may be instantiated on different nodes.

A transaction may normally commit in 3 phases: a Prepare phase, a Pre-commit phase, and a Commit phase. These three phases correspond to the PREPARE, PRECOMMIT, and COMMIT messages described above. (As discussed above, the third phase may not require a complete round trip of messages exchanged.) A description of the phases according to one embodiment follows.

Prepare Phase

In the Prepare phase, the DTMC requests each SC to return an aggregate vote for the data object the SC represents. Each SC may then send a PREPARE message to all participating replicas for its associated data object, i.e., may send the PREPARE message to the nodes on which the participating replicas are stored. These nodes are hereafter also referred to as storage participants or SPs.

On receipt of a PREPARE message, each SP may perform the necessary operations to decide its YES or NO vote and may reply with its vote to the SC. (As described above, in one embodiment functions performed by each SP may be implemented by DTMP software 137 executing on the SP.)

Each SC may determine an aggregate vote based on the individual votes received from the SPs for the data object associated with the SC and may return the aggregate vote to the DTMC. In various embodiments, the aggregate vote may be determined in different ways, e.g., based on the replies from the SPs replies and the particular criteria used to decide a quorum. In one embodiment, it is possible that an SC returns a YES aggregate vote even though one or more SPs have voted NO. For example, a quorum of NO votes may result in a NO vote for the respective data object.

If all SCs return YES votes then the DTMC may proceed to the Pre-Commit phase. In one embodiment, if any SC returns a NO vote, the DTMC may request all SCs to inform their respective participant nodes to abort the transaction. When the abort operation (described in the section below titled "Abort") is complete, the DTMC may then fail the transaction. In one embodiment, an exception to indicate the failed transaction may be thrown. For example, if the failure is due to lagging replicas, a LaggingReplicaException may be thrown.

Pre-Commit Phase

In the Pre-Commit phase, the DTMC may request each SC to pre-commit the transaction. In response, each SC may send a PRECOMMIT message to its associated SPs.

Upon receipt of the PRECOMMIT message, each SP may perform necessary operations to ensure that the SP can proceed to commit the transaction before replying to the SC with a PRECOMMIT_OK vote reply. If an SP encounters an error that prevents it from pre-committing, a PRECOMMIT_FAILED vote reply may be returned.

Each SC may then determine an aggregate vote based on the individual votes received from the SPs for the data object associated with the SC and may return the aggregate vote to the DTMC. In one embodiment, the aggregate vote determined by each SC may indicate whether the SC received a quorum of PRECOMMIT_OK replies from its associated SPs or a quorum of PRECOMMIT_FAILED replies. In one embodiment, if an SP voted NO during the Prepare phase, that SP's vote may be counted as a PRECOMMIT_FAILED vote.

In one embodiment, if the DTMC receives an aggregate vote from all SCs indicating that the SCs each received a quorum of PRECOMMIT_OK replies then the DTMC may initiate the Commit phase. If the DTMC receives an aggregate vote from any SC indicating that the SC received a quorum of PRECOMMIT_FAILED replies then the DTMC may abort the transaction.

Commit Phase

In the Commit phase, the DTMC may return success to its client without waiting for further replies. As described above, this may enable the client to experience a faster response to the request that caused the transaction to be performed.

The DTMC may then request each of the SCs to send a one-way COMMIT message to their respective SPs. The one-way COMMIT message may be sent to all SPs, including those that voted NO to the PREPARE message. By sending the COMMIT message to an SP that voted NO to the PREPARE message, the SP may be notified that its replica of the respective data object needs to later be synchronized with the replicas on SPs that are able to commit the transaction. (See the section below titled, "Unknown and Forgotten Transactions" for further information.)

In response to receiving a COMMIT message, an SP may change its state to COMMITTED.

Time-Outs

A transaction may be delayed or blocked if the coordinator or some participants have become temporarily or permanently unavailable, e.g., due to network, software, or hardware problems. Such a condition may be detected with time-outs by active nodes. A node that detects a time-out may initiate an appropriate recovery action. A description of time-outs utilized according to one embodiment and corresponding recovery actions follows.

Recovery actions discussed here may attempt to drive the transaction to completion when possible. However, in one embodiment the transaction may not be driven to completion when permanent node failures occur. In one embodiment, the client application may create new replicas to replace those that are permanently lost. Time-out or Error Encountered by a Client A client may re-drive a transaction with the same transaction ID if the transaction timed out after a time-out interval T1 or if an exception was thrown.

Time-out by the Coordinator During the Prepare Phase

In one embodiment, the DTMC may wait for a time-out interval T2 to collect votes for the Prepare phase. In one embodiment, the DTMC may abort the transaction and throw a time-out exception if the DTMC does not receive YES votes from all the SCs within the time-out interval T2. The exception may be thrown as soon as the local SPs have finished aborting; the DTMC may not wait for a quorum of replies when the abort is caused by a timed out Prepare request. (Otherwise, the abort may also be timed out. The reason to abort is to avoid new transactions from causing SPs to get stuck in the Prepared state in case of a prolonged network partition or problem that causes the time-out.)

In case messages or replies are lost in the Prepare phase, the DTMC may re-try sending the Prepare request before T2 expires. In one embodiment a configurable parameter may control whether to re-try and how many times.

Time-Out by a Participant in the Prepared State

After a participant has sent its YES vote, the participant may initiate transaction recovery (see below) if the participant does not receive either an ABORT or PRECOMMIT message within a time-out interval T3.

Time-Out by the Coordinator in and After the Prepared State

In one embodiment, the DTMC may wait for a time-out interval T4 to collect replies for its PRECOMMIT, PRE-ABORT and ABORT requests. If no decision is reached when T4 expires for a PRECOMMIT request, the DTMC may throw a time-out exception. For both PRECOMMIT and PREABORT, the DTMC will not take action to abort the transaction since the transaction may get committed by some participants.

However, in case the message or replies were lost, the DTMC may re-try sending the request before T4 expires. In one embodiment a configurable parameter may control whether to re-try and how many times.

Time-Out by a Participant Who Has Replied to a Pre-Commit or Pre-Abort Message

In one embodiment, a participant that has replied with PRECOMMIT_OK or PREABORT_OK may initiate transaction recovery if the participant does not receive a subsequent control message within a time-out interval T5.

Give-Up Time-Out by a Participant

In one embodiment, if a participant sends a YES vote to a PREPARE message and the transaction is not completed within a time-out interval T8, the participant may inform each local SP that is in an intermediate state to give up (i.e., mark itself 'bad' and sync up with a more up-to-date replica) and may then terminate the transaction locally. If T8 is zero, no give-up time-out will occur. When T8 has elapsed, any on-going recovery may be halted.

Error Handling (Other Than Time-Outs)

In one embodiment, when the DTMC encounters an error that prevents it from committing the transaction, the DTMC may abort the transaction without re-trying. When the abort operation is complete (see the section below titled "Abort") the DTMC may notify the client through an exception. The client may re-try the transaction if desired.

Transaction Recovery

Transaction recovery refers to the recovery action initiated by a participant that has timed out trying to communicate with the coordinator. In one embodiment, transaction recovery may include the following basic steps:

Elect a DTMC

Establish a DTMC

Drive the Transaction

Before describing these steps in detail below, election and decision numbers are described. To simplify discussion, unless specified otherwise or for clarity, a quorum in relation to a DTMC or a transaction may refer to the presence of a quorum for each and all participating data objects, not just a quorum of one of multiple objects. However, when used in relation to an SC, a data object, or an object-specific plugin, a quorum may refer to a quorum of that data object.

Election and Decision Numbers

In one embodiment, an election number maybe associated with each quorum-elected DTMC. The initial DTMC may have the number 1. Each time a new DTMC is elected, this number is incremented by 1.

In one embodiment, each decision may be associated with a decision number that is the same as the election number of the DTMC that made the decision. The purpose of the decision number is to prevent confusion in case a node with the current decision is re-connected with a node with a stale decision. Since a new DTMC is elected only in the presence of a quorum, the election number is unique and ever-increasing.

Elect a DTMC

Any recovering participant of an eligible data object can send an ELECT message to all other participants (including those of non-eligible data objects). A random delay may be used by each eligible participant so that they do not all send an ELECT message at the same time.

For a multi-object transaction, the object-specific plugin implementation may designate a subset of participating data objects as eligible to reduce the amount of overhead caused by the election. When none are designated as eligible, one will be chosen by the DTMC.

All participants that received this message may reply as follows:

- If the final state (commit or abort) of the transaction is known, the participant returns the final state of the transaction.
- If the transaction is unknown to both the generic DTMP and the object-specific component, the participant replies UNKNOWN.
- Otherwise, the participant replies with the following information: its node ID; and the election number and node ID of its last-known coordinator.

A participant that has responded to an ELECT message may not send an ELECT message to avoid unnecessary duplication. After responding to an ELECT message, a participant may wait a time-out interval T7 for a new coordinator, another ELECT message, or information for the final state. If the participant does not receive information after T7 expires, it start its own transaction recovery.

On receipt of the replies to an ELECT message, the requester may perform one of the following actions in the following order:

- If the requester receives a reply indicating the final state (commit or abort), it will proceed toward this state independently (see the section below titled "Going Directly to the Final State During Recovery") and inform other respondents who are not in the final state to do the same.
- In one embodiment, a DTMC cannot be elected without replies from a quorum of each participating object. Thus, if the requester does not have replies from a quorum of each participating object, the election has failed. The requester may re-try the transaction recovery after a time-out period T6 expires. Alternatively, the requester may register for a network-unpartition callback that can be used to trigger the next re-try.
- If the quorums of all objects have forgotten the transaction, the remainders that are not in a final state could be out of date. Therefore the requester marks itself 'bad', indicating a need to synchronize with a more up-to-date replica, and informs the other incomplete participants to do the same.
- If the latest DTMC indicated in the replies is among the respondents, follow the next step (see the section below titled "Establish a DTMC") to establish it as the DTMC. This prevents a re-connecting participant from disrupting the current DTMC.
- Otherwise, select a respondent with the largest node ID from the eligible objects only, and follow the next step (see the section below titled "Establish a DTMC") to establish it as the DTMC.

Going Directly to the Final State During Recovery

As described above, in response to being informed of the final state during a transaction recovery, a participant may proceed to that final state independently. There is no need to go through pre-commit or pre-abort, and there is no need to wait for a quorum (because that was already done). If the participant encounters errors committing (e.g., lost data or in an error state where it cannot commit), the object-specific modules may perform object-specific error recovery. As far as the transaction is concerned, it is completed and will be forgotten by the generic DTMP.

Establish a DTMC

If the newly elected DTMC is on a different node than the old DTMC, the new DTMC may be notified by sending a one-way NEWLEADER message to the object of which the new DTMC is a participant with the following information: node ID of the elected DTMC; and 1+the maximum election number gathered from the ELECT message replies.

Each recipient may records the new DTMC and update its election number to the one specified in the message. The new DTMC may then send a 2-way NEWLEADER message to all objects with the updated election number.

If it has not already done so, each recipient may record the new DTMC, update its election number to the one specified in the message, and then reply to the new DTMC with the decision and decision number of the last known decision.

If election number shows that the NEWLEADER message is stale, the request is rejected with a STALE_DTMC reason.

When the new DTMC gets a quorum of positive replies indicating acceptance as the new coordinator, it may proceed to the next step to re-drive the transaction. If the new DTMC times out (T6) waiting for a quorum, it may send another NEWLEADER message to all participants.

Drive the Transaction

Once the new DTMC has acceptance from a quorum, it may instantiate an SC for each participating data object if the SC is not already present. (It is important that the new DTMC does not start making a decision until a quorum of replies have been received. Otherwise, two DTMCs using the same election number may result, making conflicting decisions that cannot be resolved.) The new DTMC may then drive the transaction based on the acceptance information as follows.

The DTMC may base its decision only on those replies with the highest decision number. Decisions with lower decision numbers are stale and may be ignored. In one embodiment, the DTMC makes a new decision in the following order:

- If any decision was for the final states, tell each replica not in the final state to go directly to the final state (see the section titled "Going Directly to the Final State During Recovery").
- If any decision was to pre-commit, pre-commit the transaction.
- Otherwise, pre-abort and then abort the transaction.

Once a decision is made, the DTMC sends the decision to the participants along with the decision number. A participant processes a decision only if the decision number is not stale.

Additional Details on the Prepare Phase

In one embodiment, in case of a NO vote, the reason (e.g., NOSPACE, BLOCKED) may also be returned, and the SP may automatically roll back the transaction and release any resources used for the transaction. This is because the SC may not send an ABORT message to the SP that has voted NO.

In one embodiment, if the reason for a NO vote is due to a lagging replica, it is the responsibility of the object-specific modules for the lagging replicas to synchronize themselves with the latest version as soon as they reply NO. The generic DTMP will take no further action.

Additional Details on the Pre-Commit Phase

Similarly as described above, in case of a NO vote in the Pre-Commit phase, the SP may automatically roll back the transaction and release any resources used for the transaction.

In one embodiment, for a transaction involving a single data object, the default is to send additional data with a PRECOMMIT message. With a push model, this data may include all the data needed to update the replicas. With a pull model, this data may include only information on where to pull the update data. It is up to the object-specific plugin module implementation to decide which model to use and how to interpret this piece of data.

For a transaction involving multiple data objects, the default may be to send this data with the PREPARE message. The plugin module that implements the object-specific portion of the SC can override the default during the Prepare phase if desired. However, if the plugin chooses to send data during the Pre-commit phase for a multi-object transaction, it is the plugin's responsibility to send data for all objects to each participating replica to ensure that the transaction can be committed even when the source of the data becomes unreachable.

In one embodiment, it is the responsibility of the object-specific module of a storage participant to provide read isolation by either persisting the new data in a separate store, or by blocking reads if the pre-committed data replaces the current data. In the latter case, a participant may unblock the reads after ensuring that a quorum of participants (in its group) have pre-committed the transaction.

Additional Details on the Commit Phase

On receipt of a COMMIT message, an SP may change its state to COMMITTED. If the SP has forgotten about the transaction (e.g., due to a failed Prepare or Pre-commit request), or if it cannot commit due to uncorrectable failures (e.g., missing update data), the object-specific module may mark the SP's replica as 'bad' and initiate recovery for the replica. If the plugin has successfully pre-committed, the plugin records the fact that the transaction has been committed, even if the plugin failed to commit.

Abort

Normally a DTMC has completed an abort operation when all SCs have completed the abort operation and all local replicas on SPs have aborted. An SC has completed an aborted operation when it has received positive replies from a quorum of its SPs for the ABORT request. The quorum requirement helps prevent delayed and out-of-order abort requests from interfering with any subsequent client retries to commit.

However, if the abort operation is caused by a timed out request, it is considered completed if and only if all local replicas have aborted. The SC may not wait for a quorum of replies because the same problem causing the time out will likely prevent a quorum of replies from returning.

Unknown and Forgotten Transactions

In one embodiment, after a participant votes NO during the Prepare or Pre-commit phase, the participant forgets the transaction. Also, when a transaction is completed, the generic DTMP may forget the transaction.

With a quorum protocol, it is possible that some participants may lag behind in the transaction process. During recovery, a participant performing election may ask a participant that has forgotten the transaction for state information. It is also possible that a client may re-drive a transaction, not knowing that it has completed while the network was partitioned. In these circumstances, an ELECT message will be sent. When a generic DTMP receives this message for a forgotten transaction, the generic DTMP may ask the object-specific plugin for the requested information. The plugin may be expected to remember committed transactions for some duration. However, the plugin may not be required to remember transactions that are aborted.

Although the above technique to get state information is useful in the above scenarios, it can be expensive if it needs to be used by every new transaction because disk accesses may be involved. To avoid this cost, the plugin may only be asked in response to an ELECT message for information regarding a transaction that is unknown to the generic DTMP. If a PREPARE message is received for an unknown transaction, normal operation takes place and a participant will be instantiated, assuming that this is a new transaction. If the transaction was actually aborted and forgotten, this has the desired effect of starting the transaction afresh at the participant. However, if the forgotten transaction was committed, this has the undesirable effect of executing the transaction a second time. If the transaction is not idempotent, damaged data may result. In light of such an undesirable effect, the object-specific plugin module may be expected to remember a committed transaction until the probability of being re-driven is extremely low.

In one embodiment, if a PRECOMMIT message is received for an unknown transaction, a PRECOMMIT_FAILED response may be returned by the SP and the plugin does not process the PRECOMMIT message.

If a one-way COMMIT message is received for an unknown transaction, the object-specific plugin may be notified of a possibly bad replica, and the object-specific plugin may later attempt to re-synchronize the replica with another replica.

If a PREABORT or ABORT message is received for an unknown transaction, an OK response may be returned by the SP. The plugin may not process these messages. It is assumed that the transaction being aborted has no effect on this participant.

If an ELECT message is received for a transaction that is unknown to both the generic DTMP and the plugin, the SP may reply UNKNOWN.

Re-driven Transaction

A client may retry a timed out or failed transaction using the same transaction ID. In the case of a time out, the transaction may have completed during the time out, or there may already be a DTMC performing recovery. To avoid committing a transaction twice and to avoid multiple DTMCs running for the same transaction, the client may call a method or function indicating that the transaction is being re-driven and not started for the first time. However, when retrying a failed transaction that is not timed out, the client may treat the transaction as a new transaction. This may avoid overhead involved in re-driving a transaction. In either case, if the transaction is being retried from a different node, each object's plugin needs to be setup and joined to the transaction before re-started.

As described above, in one embodiment it may be assumed that the re-driven transaction is either idempotent or that the object-specific modules remember this transaction for some time so that it will not be re-committed.

The DTMC may fail a re-driven transaction immediately and throw an exception if a transaction with the specified transaction ID is already active at the DTMC.

In one embodiment, the DTMC that re-drives a transaction may first initiate a special case of DTMC election where it will try to establish itself as the DTMC. As part of this election, an ELECT message is sent for the following reasons:

(1) To ensure that it has a quorum and to get the correct election number updated, so that a split-brain problem with multiple DTMCs can be avoided.

(2) To assess the current state of the transaction so as to drive it from where it was left off.

The decision making for a re-driven transaction is also different from transaction recovery in the following ways:

Even when the quorums of all objects do not remember the transaction, the transaction is not aborted but re-driven as new. This is because the original DTMC might have never reached these replicas.

Similarly, when there is no Pre-committed or Pre-aborted participant (i.e., there is only Prepared participants), the transaction is not aborted but re-driven as new.

Otherwise, the decision is the same as for transaction recovery. Specifically,

If there is a committed participant, the re-driven DTMC enters the Commit phase.

If there is a Pre-committed (or Pre-aborted) participant (counting only those with the highest election number), the re-driven DTMC enters the Pre-commit (or Pre-Abort) phase.

Time Outs Summary

T1—Client time-out.

T2—DTMC prepare phase time-out. In one embodiment the default is 3 seconds.

T3—Participant prepared state time-out. In one embodiment the default is T2+T4.

T4—DTMC prepared state (and after) time-out. In one embodiment the default is the same as T2.

T5—Participant pre-commit/pre-abort time-out. In one embodiment the default is T2+T4.

T6—An ELECT requester time-out waiting for a quorum. In one embodiment the default is the same as T2.

T7—An ELECT responder time-out waiting for a new DTMC. In one embodiment the default is the same as T3.

T8—Participant giveUp time-out. In one embodiment the default is 0 (signifies no give up).

In one embodiment, time-outs may be set so that the following relationships hold:

T1<T3

T1<T5

T1>T2+T4

The rationale is that the transaction re-drive time-out should occur before the participants time-out and initiate the transaction recovery.

In one embodiment both T6 and T7 may have an exponential backoff to avoid unnecessary network overhead during an extended network partition. Also, after a certain point, the waiters may register and wait for a network unpartition event instead.

In one embodiment, timeouts may be adjusted, e.g., through an administrative tool or API.

Logging

In one embodiment, the generic DTMP (e.g., the DTMP component on each node) may log state transitions so that it can resume its work if the node is rebooted after a crash. To improve the performance of normal operations, an event may not be logged if it can be recovered by other means. In particular, in one embodiment the DTMC may not log because the participants can always carry out transaction recovery.

The participants may log information to guard against multiple node crashes. Specifically, each participant may log information in the following cases:

In the Prepare phase, a participant logs its decision before replying.

A participant logs the receipt of the PRECOMMIT or PREABORT message along with the decision number before processing it. However, the acknowledgement may not be logged.

When a new coordinator (DTMC) is elected, each participant may log the election number and the node ID of the new coordinator.

When the transaction terminates (commits or aborts), each participant (the generic DTMP on the participant) may delete its local transaction log and forget about the transaction. However, the object specific plugin module on the participant may still need to retain its own log for a longer time, as described above.

Subsequent Read Operations

As described above, in one embodiment the DTMC may return success to a client before the Commit phase of the distributed transaction protocol has been completed (e.g., may return success in response to receiving PRECOMMIT_OK messages from at least a quorum of the participant nodes). As discussed above, this may allow the client to experience a shortened latency for its request. However, this may also introduce the possibility that subsequent read operations performed by the client soon after receiving indication of success of an update transaction could return stale data. In other words, the data that is returned for the subsequent read operation may be the data that existed before the previous update transaction was performed, if the read operation is processed before the data update is committed in the Commit phase.

This may be undesirable behavior for a strictly coherent distributed file system. However, as described above, in one embodiment file (or other data object) replicas may be kept coherent with respect to each other in a loosely coherent manner rather than a strictly coherent manner. In a loosely coherent system, this may be acceptable behavior. Also, even in a loosely coherent system, the above behavior may be prevented as follows.

In one embodiment, when a participant node replies in the Pre-Commit phase with a PRECOMMIT_OK reply, the node may also commit (or partially commit) the transaction. For example, in an update transaction, the data in the replica on the participant node may be updated as specified for the transaction when the node enters the Pre-Committed state. In one embodiment, the replica data may be updated in memory (e.g., in the participant node's memory 122) but not on stable storage (e.g., not in the participant node's storage 124). (In one embodiment, the update may be fully committed and the replica may be updated on stable storage when the Commit phase is performed.)

Thus, a subsequent read operation received by the node may be satisfied using the updated data that was committed when the node entered the Pre-Committed state. Clients can be assured of receiving at least one copy of the updated data if the subsequent read operation is performed by contacting a quorum of the nodes that have replicas for the data object in question.

However, it is possible that a node that entered the Pre-Committed state could crash and lose its updated data in memory. In this event, if the node is rebooted and receives a read request for the data, the node may return the stale data, i.e., the data in the replica before the update transaction was performed. This may result in the client reading data from a quorum of nodes that do not have the latest data for the data object. The client could then perform an update operation that results in a conflict that may not be detected. However, this problem can be eliminated by requiring any rebooted node to synchronize its replica of the data object with respect to an up-to-date replica before being allowed to participate in a new transaction.

As described above, it is possible that a transaction is aborted after a participant node enters the Pre-Committed state, e.g., due to the DTMC receiving a quorum of PRE-COMMIT_FAILED replies. In this case, the update that was performed when the node entered the Pre-Committed state is an invalid update. Thus, if the transaction is aborted then the participant node may mark its replica as 'bad', indicating that the replica needs to be synchronized with an up-to-date replica.

Blocking Read and Write Accesses

In one embodiment, a subsequent transaction to update a file or data object can start accessing a particular replica of that file as soon as that participant has sent a PRECOMMIT_OK message to the co-ordinator. Since the next transaction cannot proceed without contacting a quorum of the nodes that have replicas of the file (and at least one of them has to be in PRECOMMIT_OK or a later stage), this does not affect the serializability of these transactions.

However, this leaves open the possibility that a non-transactional read might access a replica that has been PRECOMMITted, but not yet COMMITted. This would be a dirty read, because a transaction is not complete. To prevent this, in one embodiment each replica may be locked at PRECOMMIT time, and this lock may be released at COMMIT time. However, as noted earlier, updates do not have to be locked at this stage. Only read accesses need to be blocked.

In one embodiment, other update transactions may be blocked between the PREPARE and the PRECOMMIT state of a replica to ensure the serializability of update transactions. However, non-transactional read operations may be allowed to proceed in this case because they will read the state of the file that existed before the transaction started.

To achieve the above-described behavior, "colored locking" may be used in one embodiment. A "write" colored lock may be used from PREPARE to PRECOMMIT, which blocks all writers, but does not block any readers. A "read" colored lock may be used from PRECOMMIT to COMMIT, which blocks all readers, but does not block any writers.

It is noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A first node comprising:
one or more processors; and
memory;
wherein the memory stores program instructions executable by the one or more processors to implement:
receiving a request from a client application, wherein the request requires a transaction; in response to the request, sending a first message to a plurality of participant nodes participating in the transaction;
in response to receiving a reply to the first message from at least a quorum of the participant nodes, sending a second message to the plurality of participant nodes;
in response to receiving a reply to the second message from at least a quorum of the participant nodes:
returning an indication to the client application that the request was successfully processed; and
sending a third message to the plurality of participant nodes, wherein the third message instructs the participant nodes to commit the transaction;
wherein the first message comprises a message requesting each of the participant nodes to reply by indicating whether they can commit the transaction;
wherein said receiving the reply to the first message from at least a quorum of the participant nodes comprises receiving a reply indicating an ability to commit the transaction from at least a quorum of the participant nodes;
wherein the second message comprises a message requesting each of the participant nodes to enter a state indicating that the transaction is to be committed; wherein said receiving the reply to the second message from at least a quorum of the participant nodes comprises receiving a reply indicating entrance into the state indicating that the transaction is to be committed from at least a quorum of the participant nodes.

2. The first node of claim 1,
wherein sending the third message to the plurality of participant nodes comprises
sending the third message after returning the indication to the client application.

3. The first node of claim 1,
wherein the first message corresponds to a message for a first phase of a three phase commit protocol.

4. The first node of claim 1,
wherein the second message corresponds to a message for a second phase of a three-phase commit protocol.

5. The first node of claim 1,
wherein sending the third message to the plurality of participant nodes completes the first node's involvement in the transaction.

6. The first node of claim 1,
wherein completion of the transaction does not require a reply to the third message from any of the participant nodes.

7. The first node of claim 1,
wherein each participant node commits the transaction in response to receiving the third message but does not return a reply to the third message.

8. The first node of claim 1,
wherein the request comprises a request to update a file;
wherein the transaction comprises a transaction to coordinate updates to multiple replicas of the file, wherein each respective replica is located on a respective one of the plurality of participant nodes.

9. The first node of claim 1,
wherein the first node is a node in a peer-to-peer network;
wherein the peer-to-peer network implements a distributed file sharing system.

10. A first node comprising:
one or more processors; and
memory;
wherein the memory stores program instructions executable by the one or more processors to implement:
receiving a request from a client application, wherein the request requires a transaction;
in response to the request, sending a first message to a plurality of participant nodes participating in the transaction;
in response to receiving a reply to the first message from at least a quorum of the participant nodes, sending a second message to the plurality of participant nodes; in response to receiving a reply to the second message from at least a quorum of the participant nodes, sending a third message to the plurality of participant nodes,
wherein the third message instructs the participant nodes to commit the transaction;
wherein completion of the transaction does not require a reply to the third message from any of the participating nodes;
wherein the first message comprises a message requesting each of the participant nodes to reply by indicating whether they can commit the transaction;
wherein said receiving the reply to the first message from at least a quorum of the participant nodes comprises receiving a reply indicating an ability to commit the transaction from at least a quorum of the participant nodes;
wherein the second message comprises a message requesting each of the participant nodes to enter a state indicating that the transaction is to be committed;
wherein said receiving the reply to the second message from at least a quorum of the participant nodes comprises receiving a reply indicating entrance into the state indicating that the transaction is to be committed from at least a quorum of the participant nodes.

11. The first node of claim 10,
wherein sending the third message to the plurality of participant nodes completes the first node's involvement in the transaction.

12. A computer-readable memory storage medium storing program instructions executable to implement:
receiving a request from a client application, wherein the request requires a transaction;
in response to the request, sending a first message to a plurality of participant nodes participating in the transaction;
in response to receiving a reply to the first message from at least a quorum of the participant nodes, sending a second message to the plurality of participant nodes;
in response to receiving a reply to the second message from at least a quorum of the participant nodes:
returning an indication to the client application that the request was successfully processed; and
sending a third message to the plurality of participant nodes, wherein the third message instructs the participant nodes to commit the transaction;
wherein the first message comprises a message requesting each of the participant nodes to reply by indicating whether they can commit the transaction;
wherein said receiving the reply to the first message from at least a quorum of the participant nodes comprises receiving a reply indicating an ability to commit the transaction from at least a quorum of the participant nodes;
wherein the second message comprises a message requesting each of the participant nodes to enter a state indicating that the transaction is to be committed;
wherein said receiving the reply to the second message from at least a quorum of the participant nodes comprises receiving a reply indicating entrance into the state indicating that the transaction is to be committed from at least a quorum of the participant nodes.

13. The computer-readable memory storage medium of claim 12,
wherein sending the third message to the plurality of participant nodes comprises sending the third message after returning the indication to the client application.

14. The computer-readable memory storage medium of claim 12,
wherein completion of the transaction does not require a reply to the third message from any of the participant nodes.

15. The computer-readable memory storage medium of claim 12,
wherein the request comprises a request to update a file;
wherein the transaction comprises a transaction to coordinate updates to multiple replicas of the file, wherein each respective replica is located on a respective one of the plurality of participant nodes.

* * * * *